(12) United States Patent
Seo et al.

(10) Patent No.: US 10,778,321 B2
(45) Date of Patent: Sep. 15, 2020

(54) METHOD AND DEVICE FOR RELAYING SIGNAL IN MOBILE COMMUNICATION SYSTEM

(71) Applicant: LG ELECTRONICS INC., Seoul (KR)

(72) Inventors: Hanbyul Seo, Seoul (KR); Sangwook Lee, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 178 days.

(21) Appl. No.: 16/020,784

(22) Filed: Jun. 27, 2018

(65) Prior Publication Data
US 2019/0007124 A1  Jan. 3, 2019

Related U.S. Application Data

(60) Provisional application No. 62/525,688, filed on Jun. 27, 2017.

(51) Int. Cl.
*H04B 7/14* (2006.01)
*H04B 7/04* (2017.01)
*H04L 5/14* (2006.01)
*H04B 7/155* (2006.01)
*H04L 5/00* (2006.01)

(52) U.S. Cl.
CPC ............... *H04B 7/14* (2013.01); *H04B 7/04* (2013.01); *H04B 7/15535* (2013.01); *H04B 7/15557* (2013.01); *H04L 5/001* (2013.01); *H04L 5/0044* (2013.01); *H04L 5/0053* (2013.01); *H04L 5/143* (2013.01); *H04L 5/1469* (2013.01); *H04L 5/0007* (2013.01)

(58) Field of Classification Search
CPC ......... H04L 5/14; H04L 5/1469; H04L 5/001; H04L 5/0053; H04L 5/0055; H04L 5/0048; H04L 1/1854; H04L 5/0092; H04L 1/1812; H04L 2001/0097; H04L 5/0007; H04L 1/1678; H04L 1/1861; H04L 2001/0093; H04L 5/0035; H04L 5/0073; H04L 5/0094; H04L 5/0023; H04L 5/0032; H04L 5/0044
USPC .......................................................... 370/280
See application file for complete search history.

(56) References Cited

U.S. PATENT DOCUMENTS

2010/0151793 A1* 6/2010 Wang .................... H04W 52/16
455/67.11

\* cited by examiner

*Primary Examiner* — Natasha W Cosme
(74) *Attorney, Agent, or Firm* — Lee Hong Degerman Kang Waimey

(57) ABSTRACT

Provided is a method for a relay that supports a time division duplex (TDD) operation for temporally multiplexing a first link, which is either an uplink or downlink, and a second link, which is different from the first link. The method comprises: receiving, by the relay, a first radio signal through a first reception antenna for the first link; limiting, by the relay, an amplification rate of a first transmission antenna for the first link or an amplification rate of a second transmission antenna for the second link, based on an amplitude of the first radio signal; and relaying, by the relay, the first radio signal through the first transmission antenna without decoding the first radio signal if the amplification rate of the second transmission antenna is limited.

4 Claims, 13 Drawing Sheets

METHOD AND DEVICE FOR RELAYING SIGNAL IN MOBILE COMMUNICATION SYSTEM

CROSS-REFERENCE TO RELATED APPLICATION

Pursuant to 35 U.S.C. § 119(e), this application claims the benefit of U.S. Provisional Patent Application No. 62/525,688, filed on Jun. 27, 2017, the contents of which are hereby incorporated by reference herein in its entirety.

BACKGROUND OF THE INVENTION

Field of the Invention

The present document relates to relaying signals in a mobile communication system, and more particularly, to a relaying Time Division Duplex (TDD) signals by using an amplify-and-forward manner.

Related Art

The International Telecommunication Union Radio Communication Sector (ITU-R) is conducting a standardization operation of International Mobile Telecommunication (IMT)-Advanced which is a next-generation mobile communication system after 3rd generation. The IMT-Advanced aims to support Internet Protocol (IP) based multimedia service at data rate of 1 Gbps in stationary and low-speed moving states and 100 Mbps in a high-speed moving state.

The 3rd Generation Partnership Project (3GPP) as a system standard that meets the requirements of the IMT-Advanced prepares for LTE-Advanced (LTE-A) created by improving Long Term Evolution (LTE) based on Orthogonal Frequency Division Multiple Access (OFDMA)/Single Carrier-Frequency Division Multiple Access (SC-FDMA). The LTE-A is one of the strong candidates for the IMT-Advanced.

In recent years, there has been a growing interest in device-to device (D2D) technology for direct communication between devices. In particular, the D2D has attracted attention as communication technology for a public safety network. Commercial communication networks are rapidly changing to LTE, but current public safety networks are mainly based on 2G technology in terms of conflicts with existing communication standards and cost. The technological gaps and demands for improved services have led to efforts to improve the public safety networks.

The public safety networks have higher service requirements (i.e., reliability and security) than the commercial communication networks and require direct signal transmission and reception, or D2D operation, between the devices, particularly when coverage of cellular communications is insufficient or unavailable.

A D2D operation can have various advantages in that the D2D operation is signal transmission/reception between neighboring devices. For example, a D2D terminal has high data rate and low latency and is capable of data communication. In addition, the D2D operation can distribute traffic which concentrates on a base station and can also serve to expand the coverage of the base station if the D2D terminal serves as a repeater.

The aforementioned D2D communication can be extensively applied to signal transmission and reception between vehicles, and vehicle-related communication is specifically referred to as V2X (VEHICLE-TO-EVERYTHING) communication.

The term 'X' in V2X may represent pedestrian, vehicle, infrastructure/network, etc., which may be denoted by V2P, V2V, and V2I/N.

SUMMARY OF THE INVENTION

The present embodiment provides a method and device for effectively performing a relay operation in a time division duplex (TDD) mode. Specifically, the present embodiment provides a method and device that prevent amplification of an unintended reception signal when performing a relay operation in an amplify-and-forward (AF) manner. For example, the present embodiment provides a method and device that prevent saturation of a radio frequency (RF) circuit of a relay, caused by strong interference created by repeating long-range amplification of an unintended signal.

One embodiment of the present embodiment provides a method and device for a relay that support a time division duplex (TDD) operation for temporally multiplexing a first link, which is either an uplink or downlink, and a second link, which is different from the first link.

The method according to the present embodiment includes: receiving, by the relay, a first radio signal through a first reception antenna for the first link; limiting, by the relay, an amplification rate of a first transmission antenna for the first link or an amplification rate of a second transmission antenna for the second link, based on an amplitude of the first radio signal; and relaying, by the relay, the first radio signal through the first transmission antenna, without decoding the first radio signal if the amplification rate of the second transmission antenna is limited.

The device according to the present embodiment includes: a first antenna including a first reception antenna and first transmission antenna for a first link; a second antenna including a second reception antenna and second transmission antenna for a second link, which is different from the first link; and a processor that receives a first radio signal through the first reception antenna, determines whether to limit an amplification rate of the first transmission antenna or second transmission antenna, based on an amplitude of the first radio signal, and that relays the first radio signal through the first transmission antenna, without decoding the first radio signal if the amplification rate of the second transmission antenna is limited.

DESCRIPTION OF EXEMPLARY EMBODIMENTS

The technical features to be described below may be used in communication standards established by 3rd Generation Partnership Project (3GPP) standardization organizations or communication standards established by Institute of Electrical and Electronics Engineer (IEEE) standardization organizations. For example, the communication standards established by the 3GPP standardization organizations include Long Term Evolution (LTE) and/or enhancements of the LTE systems. The enhancements of the LTE systems include LTE-A (Advanced), LTE-A Pro, and/or 5G New Radio (NR). The communication standards established by the IEEE standardization organizations include wireless local area network systems such as IEEE 802.11a/b/g/ac/ax. The aforementioned systems use various multiple access technologies such as Orthogonal Frequency Division Multiple Access (OFDMA), and/or Single Carrier-Frequency Division Multiple Access (SC-FDMA) in uplink and/or downlink. For example, the OFDMA only can be used for downlink, and the SC-FDMA only can be used in uplink. Alternatively, the OFDMA and SC-FDMA can be used in combination in uplink and/or downlink.

Figure 1:
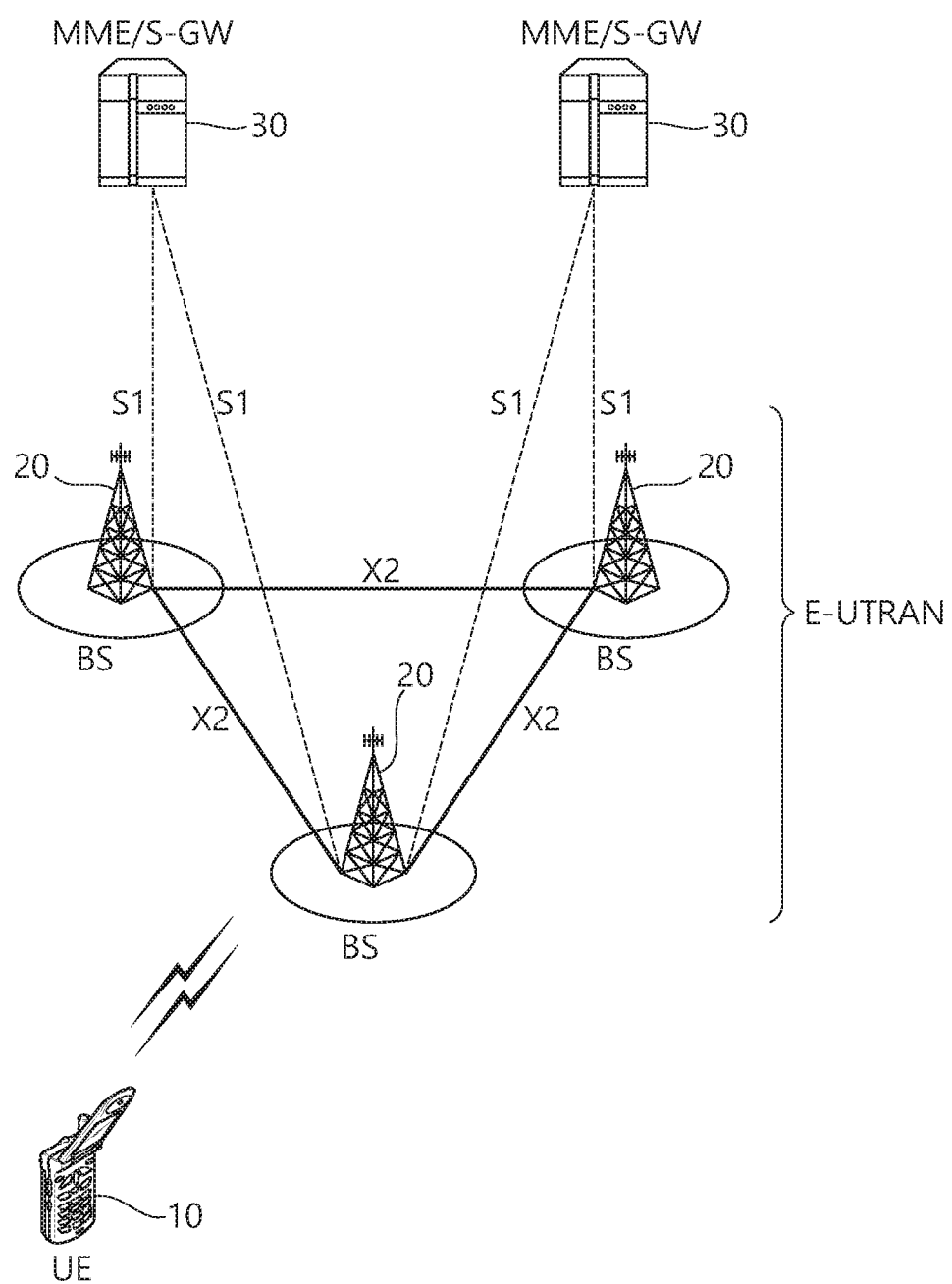
FIG. 1 shows an example of a wireless communication system to which technical features of the present embodiment may apply.

FIG. 1 shows an example of a wireless communication system to which technical features of the present embodiment may apply. Specifically, FIG. 1 shows an example based on Evolved-Universal Terrestrial Radio Access Network (E-UTRAN). The aforementioned LTE is part of Evolved-UMTS (E-UMTS) which uses Evolved-Universal Terrestrial Radio Access Network (E-UTRAN).

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), a wireless device, and a station (STA). The base station 20 generally represents a fixed station that communicates with the UE 10 and may be referred to as other terms such as an evolved-NodeB (eNB), a base transceiver system (BTS), and an access point.

The base stations 20 may be connected to each other through an X2 interface. The base station 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Figure 2:
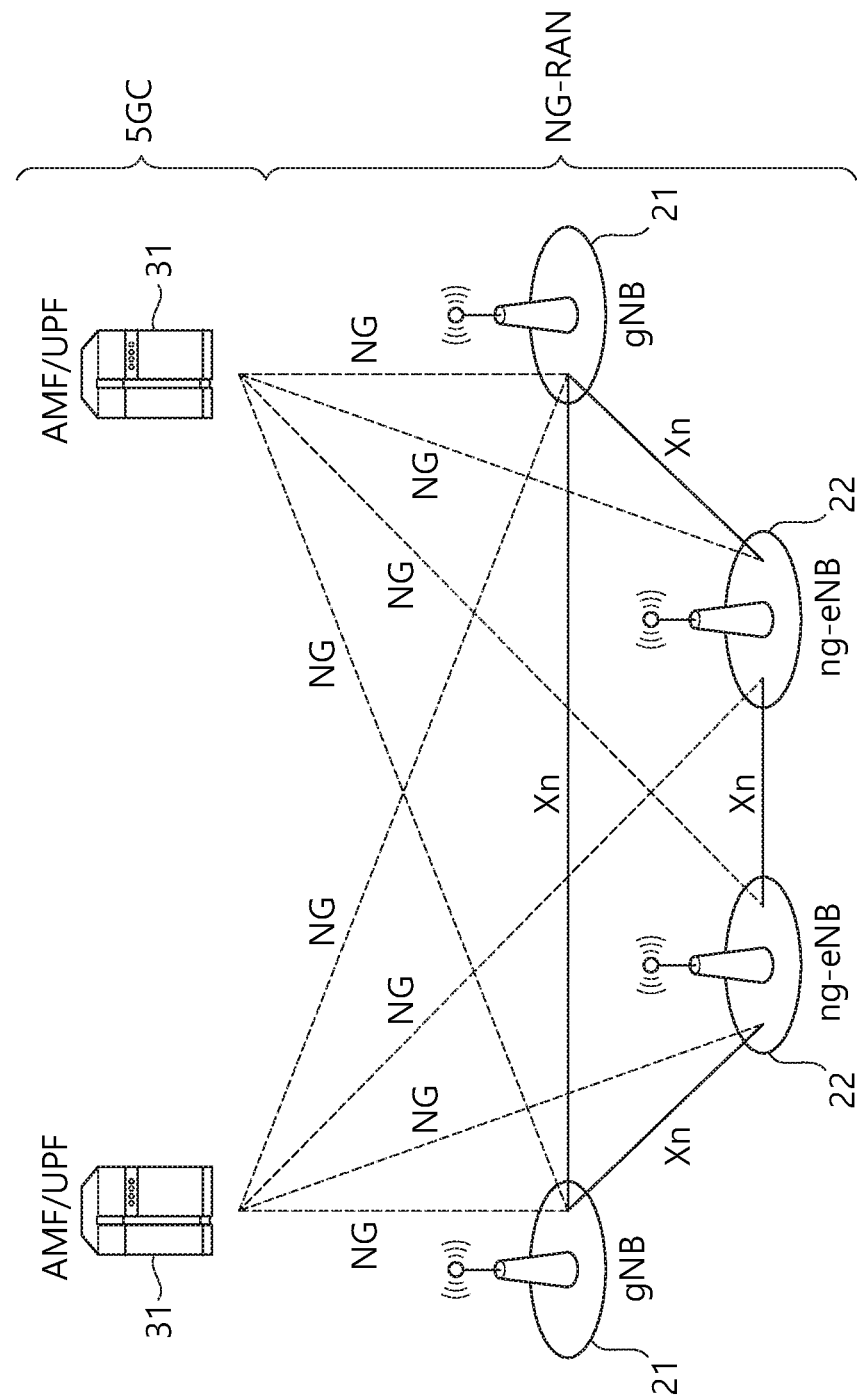
FIG. 2 shows another example of a wireless communication system to which technical features of the present embodiment may apply.

FIG. 2 shows another example of a wireless communication system to which technical features of the present embodiment may apply. Specifically, FIG. 2 shows an example in which 5G New Radio (NR) standards are used. A communication entity used for the 5G NR standards absorbs some or all of the functions of the entity (e.g., eNB, MME, and S-GW) introduced in FIG. 1, which may be identified by the name "NG" or "ng" so as to distinguish these standards from the existing/conventional standards.

The system of FIG. 2 includes NG-Radio Access Network (RAN) which communicates with the UE, and the NG-RAN 21 and 22 includes gNB 21 or ng-eNB 22 which are entities corresponding to base stations. A network interface, which is called an Xn interface, is defined between the NG-RAN entities 21 and 22. The gNB 21 provides an NR user plane and control plane for the UE, and accesses 5G Core network (5GC) through an NG interface shown in FIG. 2. The Ng-eNB 22 is an entity that provides Evolved-Universal Terrestrial Radio Access (UTRA)-based user plane and control plane for the UE, and accesses the 5GC through the NG interface.

The Access and Mobility Management Function (AMF) is an entity that includes the conventional MME function, and communicates with the NG-RAN 21 and 22 through an NG-C interface. The NG-C interface is a control plane interface between the NG-RAN and the AMF.

The User Plane Function (UPF) is an entity that includes the conventional S-GW function, and communicates with the NG-RAN 21 and 22 through an NG-U interface. The NG-U interface is a user plane interface between the NG-RAN and the AMF.

In the system of FIG. 1 and/or FIG. 2, layers of a radio interface protocol between the network and the UE can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, the structure of a radio frame sent and received through a physical channel will be described.

In the LTE standards (and the enhancements of the LTE standards), one radio frame includes 10 subframes, and one subframe includes two slots. The length of one subframe may be 1 ms, and the length of one slot may be 0.5 ms. The time during which one subframe is transmitted is referred to as a Transmission Time Interval (TTI). The TTI may be a minimum unit for scheduling.

Unlike the LTE standards, the NR standards support various numerologies, and therefore a variety of radio frame structures are established. The NR standards support a plurality of subcarrier spacings in the frequency domain, and NR numerologies are determined by the numerology being used. The following Table 1 tabulates multiple numerologies supported by NR. Each numerology is identified by the index "$\mu$".

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |

TABLE 1-continued

| μ | Subcarrier spacing | Cyclic prefix | Supported for data | Supported for synch |
|---|---|---|---|---|
| 3 | 120 | Normal | Yes | Yes |
| 4 | 240 | Normal | No | Yes |

As shown in Table 1, the subcarrier spacing may be set to either 15, 30, 60, 120, or 240 kHz, and its specific numerical value may be varied. Thus, each spacing (e.g., μ=0, 1, . . . , 4) may be denoted by the first, second, . . . , fifth subcarrier spacing (i.e., N subcarrier spacings).

As shown in Table 1, some subcarrier spacings may not be used to send user data (for example, Physical Uplink Shared Channel (PUSCH), Physical Downlink Shared Channel (PDSCH), etc.). That is, user data transmission may not be supported for at least one preset subcarrier spacing (for example, 240 kHz).

Moreover, as shown in Table 1, synchronous channels (for example, Primary Synchronization Signal (PSS), Secondary Synchronization Signal (SSS), Physical Broadcast Channel (PBCH), etc.) may not be supported for some subcarrier spacings. That is, synchronous channels may be supported for at least one subcarrier spacing (e.g., 60 kHz).

In the NR standards, the number of slots and the number of symbols may be set differently depending on various numerologies, that is, various subcarrier spacings. A detailed example of this will be given in the following Table 2.

TABLE 2

| μ | Number of symbols in a slot | Number of slots in a radio frame | Number of slots in a subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

According to Table 2, in the first numerology in which "μ=0", one radio frame includes 10 subframes, one subframe corresponds to 1 slot, and 1 slot includes 14 slots. In the present embodiment, the term 'symbol' means a signal transmitted during a specific time period—for example, a signal generated by Orthogonal Frequency Division Multiplexing (OFDM) processing. That is, the term 'symbol' used herein may refer to an OFDM/OFDMA symbol or an SC-FDMA symbol. A cyclic prefix (CP) may be positioned between each symbol.

Figure 3:
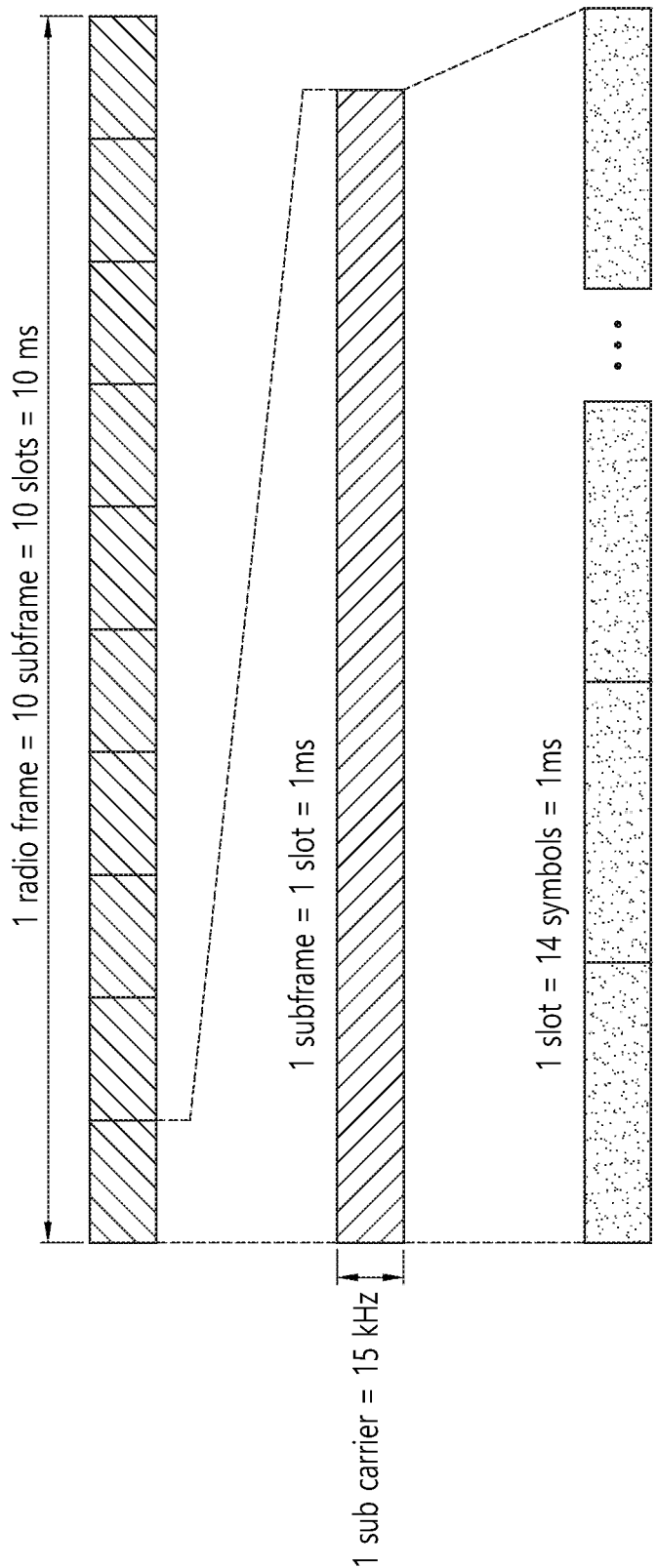
FIG. 3 shows an example of application of a particular numerology.

FIG. 3 shows an example of application of a particular numerology. That is, FIG. 3 shows a case in which μ=0.

Figure 4:
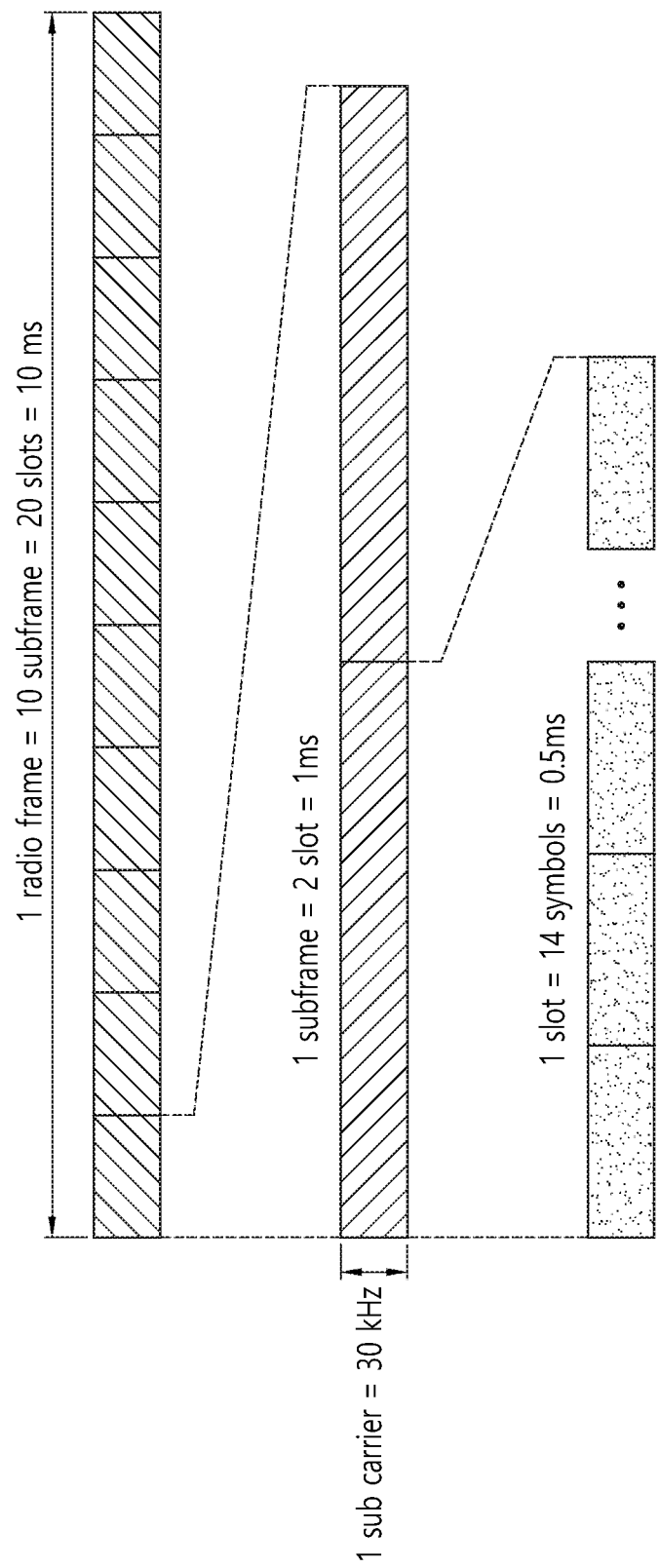
FIG. 4 shows an example of application of another numerology.

FIG. 4 shows an example of application of another numerology. That is, FIG. 4 shows a case in which μ=1.

In the example in Table 2, a normal cyclic prefix (CP) may be applied. If an extended CP is applied, the numerology in the following Table 3 may be used.

TABLE 3

| μ | Number of symbols in a slot | Number of slots in a radio frame | Number of slots in a subframe |
|---|---|---|---|
| 2 | 12 | 40 | 4 |

Meanwhile, Frequency Division Duplex (FDD) and/or Time Division Duplex (TDD) may be used in a wireless system in which an example of the present embodiment is applied. For TDD, in LTE systems, uplink and downlink subframes are allocated in subframes.

In NR standards/systems, each symbol may be distinguished by downlink (denoted by D), flexible (denoted by X), or uplink (denoted by U) as in the following table. The following table may be applied commonly to specific cells or adjacent cells or applied individually or differently to each UE.

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |

For convenience of explanation, Table 4 shows only some of the formats (i.e., TDD formats) actually defined in the NR standards, and a specific allocation technique may be changed or added.

The UE may be assigned a slot format (i.e., TDD format) through an upper-layer signal, based on Downlink Control Information (DCI) sent via Physical Downlink Control Channel (PDCCH), or based on a combination of the upper-layer signal (i.e., RRC signal) and the DCI.

Figure 5:
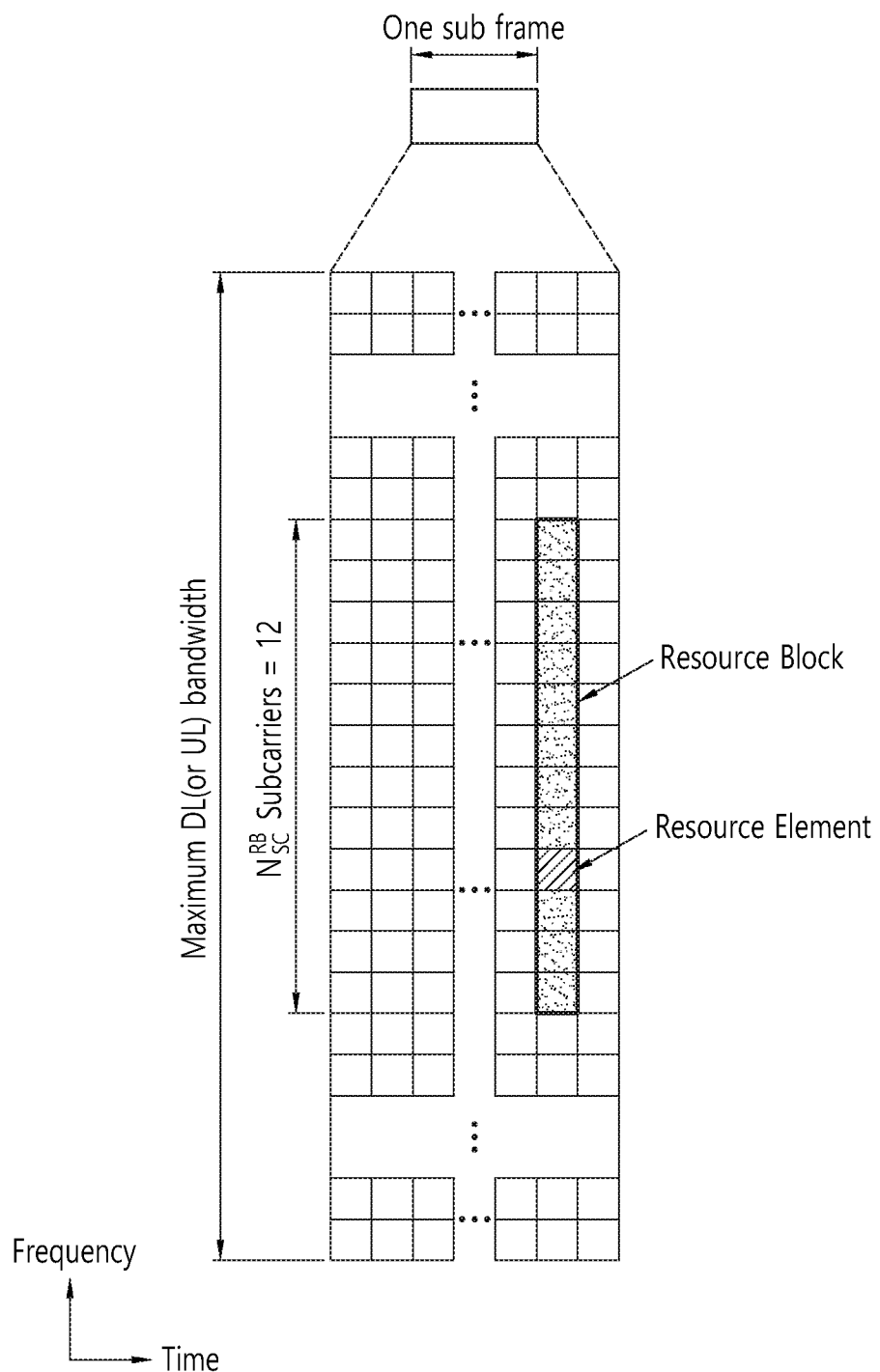
FIG. 5 is a view showing an example of a resource grid.

FIG. 5 is a view showing an example of a resource grid. The example in FIG. 5 shows a time-frequency resource grid used in the NR standards. The example in FIG. 5 may be applied in uplink and/or downlink. As shown in the drawing, one subframe includes a plurality of slots on the time axis. Specifically, "14·2$^μ$" symbols may be represented within the resource grid based on the μ value. Also, as shown in the drawing, one resource block (RB) may occupy 12 contiguous subcarriers. One resource block may be referred to as a physical resource block (PRB), and each physical resource block may include 12 resource elements (RE). The number of resource blocks RB that can be allocated may be determined based on the smallest value and the largest value. Moreover, the number of resource blocks RB that can be allocated may be set individually according to the numerology "μ". It may have the same value or different values for uplink and downlink.

A cell search technique conducted in the NR standards will be described below. The UE may perform a cell search in order to acquire time and/or frequency synchronization with a cell and acquire the identifier (cell ID) of the cell. For the cell search, synchronous channels such as Primary Synchronization Signal (PSS), Secondary Synchronization Signal (SSS), and Physical Broadcast Channel (PBCH) may be used.

Figure 6:
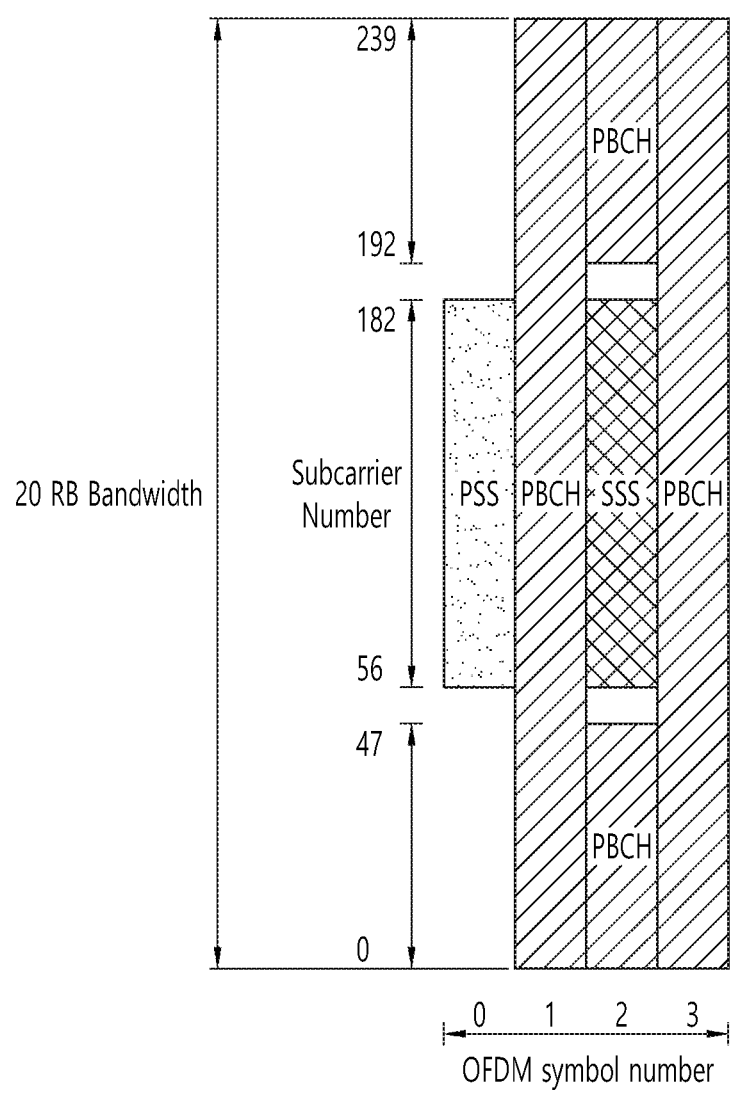
FIG. 6 shows an example of a synchronous channel applied to an example of the present embodiment.

FIG. 6 shows an example of a synchronous channel applied to an example of the present embodiment. As shown in the drawing, PSS and SSS include one symbol and 127 subcarriers, and PBCH is sent through 3 symbols and may include 240 subcarriers.

PSS is used for acquiring Synchronization Signal/PBCH block (SSB) symbol timing, and indicates three hypotheses for cell ID identification. SSS is used for cell ID identification, and indicates 336 hypotheses. As a consequence, 1008 physical layer cell IDs may be configured through PSS and SSS.

An SSB block may be repeatedly sent according to a preset pattern within a 5 ms window. For example, when L SSB blocks are sent, SSB #1 through SSB # L all contain the same information but may be sent through beams of different directions. That is, quasi co-location (QCL) may not be applied for SSB blocks within a 5 ms window. The beams used to receive SSB blocks may be used in a subsequent operation (e.g., random access operation, etc.) between the UE and the network. The SSB blocks may be repeated at specific intervals. The repetition intervals may be set for each individual numerology.

As shown in the drawing, a PBCH has a bandwidth of 20 RBs in the 2/4th symbol and a bandwidth of 8 RBs in the third symbol. The PBCH includes a DM-RS for decoding the PBCH. The frequency region of the DM-RS is determined by the cell ID value. Since no CRC (cell-specific RS) is defined in NR, unlike in the LTE standards, a special DM-RS is defined for decoding the PBCH. A PBCH-DMRS may contain information that indicates the SSB index.

The PBCH performs various functions, a typical one of which is a function for broadcasting an MIB (Master Information Block). For reference, system information (SI) is divided into minimum SI (MSI) and other SI (OSI). The minimum SI may be subdivided into MIB and SIB1, and the remaining part of the minimum SI, except the MIB, may be called Remaining Minimum SI (RMSI).

The MIB contains information required to decode the System Information Type1 (SIB1). For example, the MIB contains the subcarrier spacing applied to SIB1 (and messages-2/4 used in a random access process and other system information (SI)), the frequency offset between an SSB and a subsequent RB, the bandwidth of PDCCH/SIB, and information for decoding PDCCH (e.g., information about search-space/CORESET/DM-RS to be described later). The MIB may be periodically sent, and the same information may be repeatedly sent during a time period of 80 ms. The SIB1 is repeatedly sent through PDSCH, and contains control information for initial access from the UE and information for decoding other SIBs.

Hereinafter, PDCCH decoding will be described.

A PDCCH search space corresponds to a region in which the UE performs blind decoding of a PDCCH. In the LTE standards, the search space is divided into a common region and a UE-specific region, and the size of each region or the size of a Control Channel Element (CCE) included in the PDCCH is determined by the format of the PDCCH.

In the NR standards, a resource-element group (REG) and CCE for the PDCCH are defined. Also, in NR, the concept of Control Resource Set (CORESET) is defined. Specifically, 1 REG corresponds to 1 RB which is sent through 12 resource elements (REs), that is, one OFDM symbol, and each REG includes a DM-RS. 1 CCE includes a plurality of REGs (e.g., 6 REGs). The PDCCH may be sent through a resource consisting of 1, 2, 4, 8, or 16 CCEs. In this case, the number of CCEs may be determined by the aggregation level. That is, if the aggregation level is 1, one CCE may be included in a PDCCH for a specific UE, if the aggregation level is 2, two CCEs may be included in it, if the aggregation level is 4, four CCEs may be included in it, if the aggregation level is 8, eight CCEs may be included in it, and if the aggregation level is 16, 16 CCEs may be included in it.

Meanwhile, the CORESET may be defined on 1/2/3 OFDM symbols and a plurality of RBs. In the LTE standards, the number of symbols for PDCCH is defined by Physical Control Format Indicator Channel (PCFICH), whereas, in the NR standards, PCFICH is not used but instead the number of symbols for CORESET may be defined by an RRC message (and/or PBCH/SIB1). Moreover, in the LTE standards, the frequency region of PDCCH is the same as the entire system band and therefore there is no signaling, whereas, in NR, the frequency region of CORESET may be defined in RBs by an RRC message (and/or PBCH/SIB1).

In the NR standards, too, the PDCCH search space is divided into a common region and a UE-specific region. Since the UE-specific region may be indicated through an RRC message, an RRC connection may be needed in order for the UE to decode the UE-specific region. The search space of the UE-specific region may contain control information for PDSCH decoding to be allocated to the UE.

A common search space should be defined because PDCCH needs to be decoded even while the RRC setup is not complete. For example, a common search space may be defined, in order to configure a PDCCH for decoding a PDSCH that transmits SIB1, or in order to configure a PDCCH for receiving MSG2 or MSG4 in a random access process. In the NR standards, like the LTE standards, PDCCH may be scrambled by Radio Network Temporary Identifiers (RNTIs) for a particular purpose. The foregoing description and what has been added above may be summed up as in the following table.

TABLE 5

| Type | Search Space | RNTI | Use Case |
| --- | --- | --- | --- |
| Type0-PDCCH | Common | SI(System Info.)-RNTI on a primary cell | RMSI decoding |
| Type0A-PDCCH | Common | SI-RNTI on a primary cell | Other SI decoding |
| Type1-PDCCH | Common | RA(Random access)-RNTI, C(Cell)-RNTI, TC(Temporary Cell)-RNTI, on a primary cell | Msg2, Msg4 decoding in RACH |
| Type2-PDCCH | Common | P(Paging)-RNTI on a primary cell | Paging Decoding |

As in the above table, Type0 or Type0A may be used for SI decoding. Besides what has been shown in the above table, a search space such as Type3 may be additionally defined.

Hereinafter, a resource allocation technique will be explained.

In the NR standards, a specific number (e.g., up to 4) of bandwidth parts (BWPs) may be defined. A BWP (or carrier BWP) is a set of contiguous PRBs, and may be represented by contiguous subsets of a common RB (CRB). Each RB in the CRB may be indicated by CRB0, CRB1, CRB2, etc.

Figure 7:
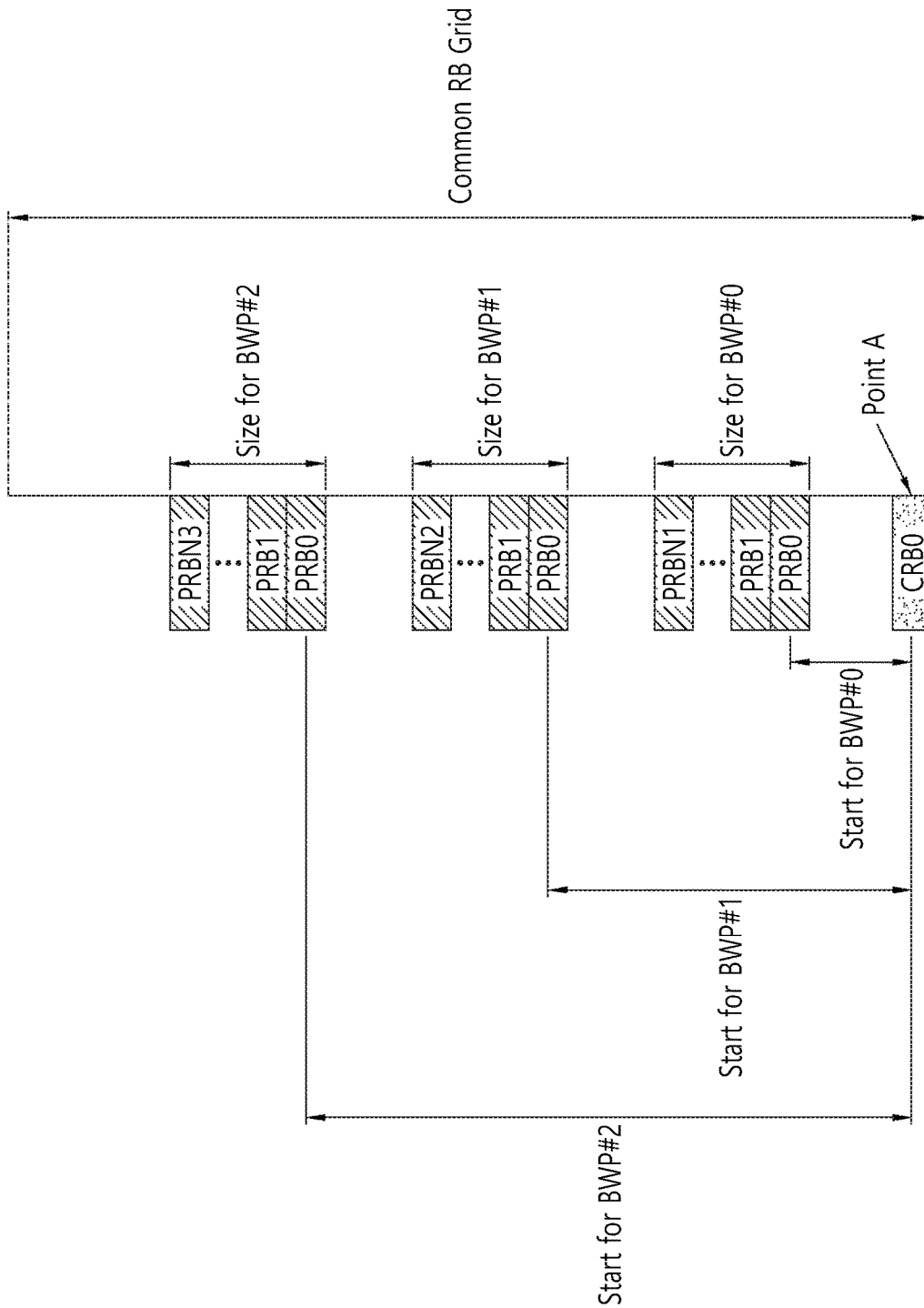
FIG. 7 shows an example of a frequency allocation technique in the present embodiment.

FIG. 7 shows an example of a frequency allocation technique in the present embodiment. As shown in the drawing, a plurality of BWPs may be defined in a CRB grid. The reference point (or common reference point, starting point, etc.) of the CRB grid is referred to as a so-called "point A" in the NR standards, and indicated by the aforementioned RMSI (i.e., SIB1). Specifically, a frequency offset between a frequency band at which an SSB is transmitted and "point A" may be indicated through RMSI. "Point A" corresponds to the central frequency of CRB0 shown in the drawing. Also, "point A" may be a point at which a variable "k" indicating the frequency band of a resource element RE is set to 0 in the NR standards. In an example, a plurality of BWPs shown in FIG. 7 are set up for a single cell (for example, primary cell). As shown in the drawing, a plurality of BWPs may be set up individually or commonly for each cell.

As shown in the drawing, the starting point and size of each BWP may be defined from CRB0. For example, the starting point of BWP #0, the first BWP, may be defined by an offset from CRB0, and the size of BWP may be defined by the size for BWP #0.

A specific number (e.g., up to 4) of BWPs may be set up for the UE. At a specific point in time, a specific number (e.g., 1) of BWPs may be activated for each cell. The number of BWPs that can be set up or activated may be set up commonly or individually for uplink and downlink. The UE may perform PDSCH, PDCCH, and/or Channel State Information (CSI)-RS monitoring/reception only on an activated downlink BWP. Moreover, the UE may perform Physical Uplink Shared Channel (PUSCH) and Physical Uplink Control Channel (PUCCH) transmission only on an activated uplink BWP.

Figure 8:
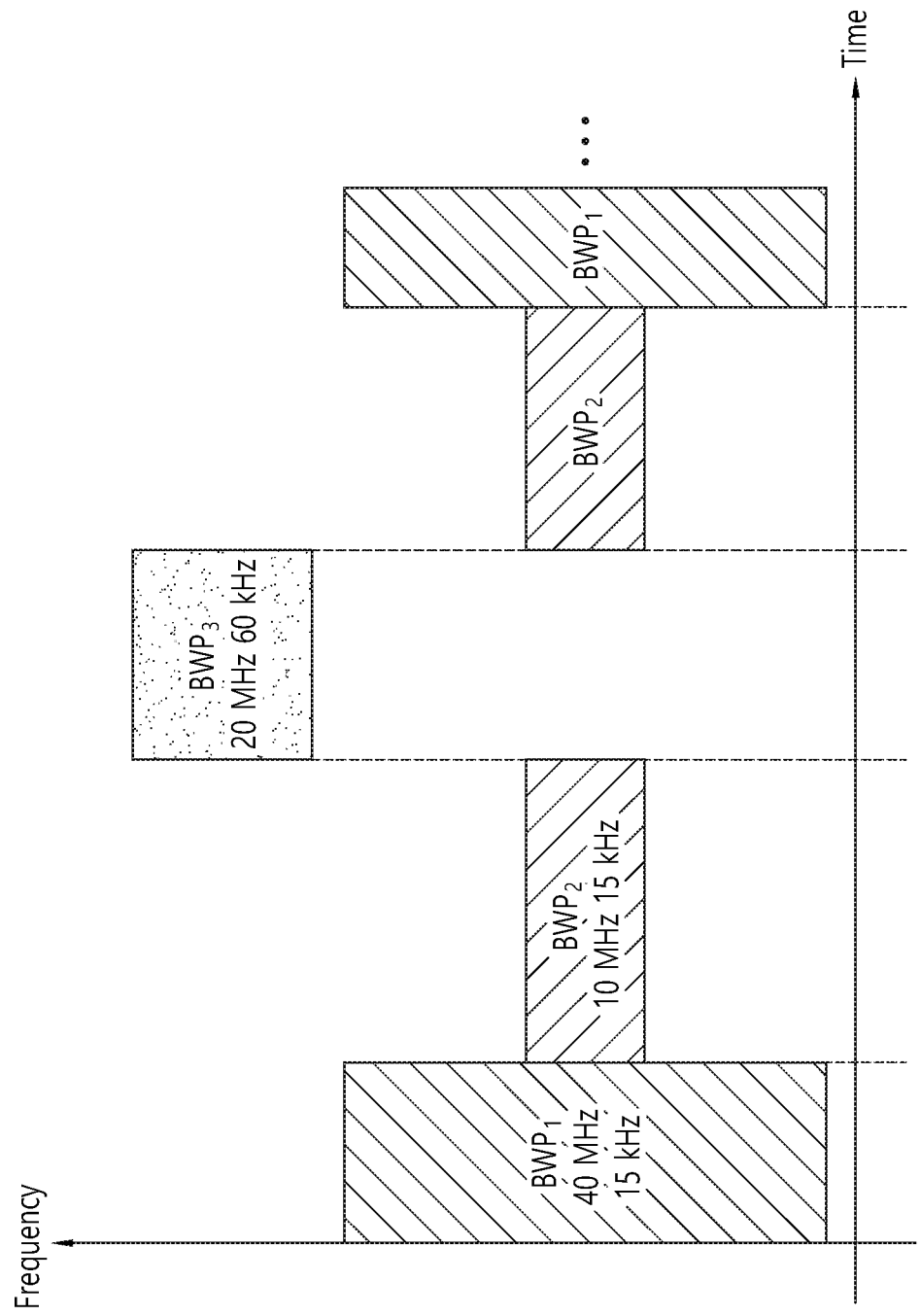
FIG. 8 shows an example in which a plurality of BWPs are allocated.

FIG. 8 shows an example in which a plurality of BWPs are allocated.

As shown in the drawing, 3 BWPs may be set up, the first BWP may span a 40 MHz band, and may use subcarrier spacing of 15 kHz. Also, the second BWP may span a 10 MHz band, and may use subcarrier spacing of 15 kHz. Also, the third BWP may span a 20 MHz band, and may use subcarrier spacing of 60 kHz. The UE may set up at least one of the BWPs shown in the drawing as an activated BWP, and perform uplink and/or downlink data communication through this BWP.

A time resource allocation technique, a type of resource allocation, will be described below. Time resources may be indicated by indicating a time difference/offset based on the transmission point of a PDCCH that allocates downlink or uplink resources. For example, the starting point of PDSCH/PUSCH corresponding to PDCCH or the number of symbols occupied by PDSCH/PUSCH may be indicated.

Hereinafter, carrier aggregation will be described. In the NR standards, too, like the LTE standards, carrier aggregation may be supported. That is, the bandwidth may be increased by aggregating contiguous or non-contiguous component carriers (CC), and, as a result, the bitrate may be increased. Each CC may correspond to a (serving) cell, and each CC/cell may be classified as Primary Serving Cell (PSC)/Primary CC (PCC) or Secondary Serving Cell (SSC)/Secondary CC (SCC).

Hereinafter, a protocol architecture between the aforementioned network entities will be described.

Figure 9:
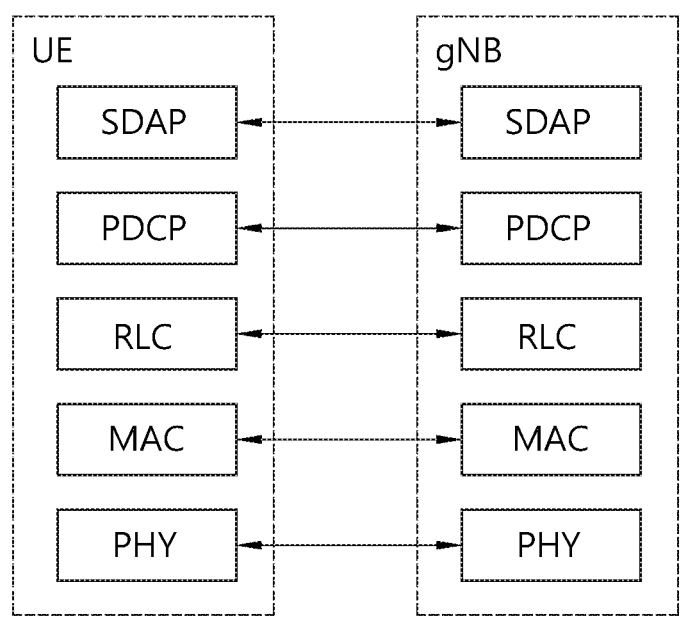
FIG. 9 is a block diagram showing a radio protocol architecture for a user plane.
Figure 10:
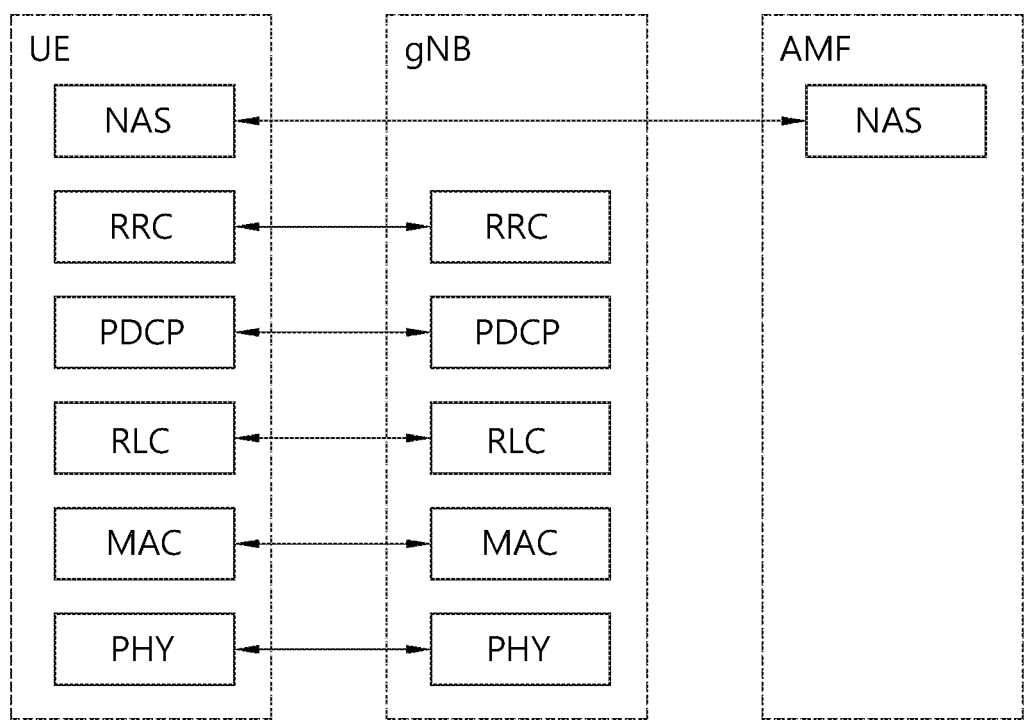
FIG. 10 is a block diagram showing a radio protocol architecture for a control plane.

FIG. 9 is a block diagram showing a radio protocol architecture for a user plane. FIG. 10 is a block diagram showing a radio protocol architecture for a control plane. The user plane is a protocol stack for user data transmission. The control plane is a protocol stack for control signal transmission.

Referring to FIGS. 9 and 10, a physical (PHY) layer provides information transfer services to upper layers on a physical channel. The PHY layer is coupled with a Medium Access Control (MAC) layer, i.e., an upper layer of the PHY layer, through transport channels. Data is transferred between the MAC layer and the PHY layer through the transport channel. The transport channels are classified by how and with what characteristics data are transferred over the radio interface.

Between different physical layers, i.e., the physical layer of a transmitter and the physical layer of a receiver, data are transferred through the physical channel. The physical channel may be modulated by OFDM processing, and time and frequency are used as radio resources for the physical channel.

The functions of the MAC layer include mapping between logical channels and transport channels, and multiplexing/de-multiplexing of MAC Service Data Units (SDUs) belonging to logical channels into/from transport blocks (TBs) delivered to/from the PHY layer on transport channels. The MAC layer provides services to a Radio Link Control (RLC) layer through logical channels.

The functions of the RLC layer include concatenation, segmentation and reassembly of RLC SDUs. In order to guarantee various quality of services (QoSs) required by radio bearers (RBs), the RLC layer provides three operating modes: Transparent Mode (TM), Unacknowledged Mode (UM), and Acknowledged Mode (AM). The AM RLC provides error correction through automatic repeat request (ARQ).

The functions of a Packet Data Convergence Protocol (PDCP) layer for the user plane include transfer of user data, header compression, and ciphering. The functions of the PDCP layer for the control plane include transfer of control plane data, and ciphering/integrity protection.

An Service Data Protocol (SDAP) in the user plane performs mapping between a QoS flow and a Data Radio Bearer (DRB).

A radio resource control (RRC) layer is defined only in the control plane. The RRC layer serves to control the logical channel, the transport channel, and the physical channel in association with configuration, reconfiguration and release of radio bearers (RBs). A radio bearer RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

In the LTE standards, when an RRC connection is established between an RRC layer of the UE and an RRC layer of the E-UTRAN, the UE is in an RRC-connected state, and otherwise the UE is in an RRC idle state. In the NR standards, an RRC-inactive state was additionally introduced. The RRC-inactive state may be used for various purposes. For example, an mMTC (massive machine type communications) UE may be used by efficiently managing it. When a specific condition is met, a transition from one of the aforementioned three states to another state is made.

A preset operation may be performed depending on the RRC state. For example, in the RRC idle state and RRC-inactive state, system information (SI) may be broadcasted, and mobility may be supported based on cell re-selection which is managed by the UE. It should be noted that, in the RRC idle state, the 5G core network (5GC) explained in FIG. 2, etc. may manage paging for the UE and support a discontinuous reception (DRX) operation for 5GC paging, whereas, in the RRC-inactive state, the NG-RAN explained in FIG. 2, etc. may manage paging for the UE and support DRX operation for NG-RAN paging. Meanwhile, in both the RRC-inactive state and the RRC-connected state, the user plane and the control plane may be both established between the NG-RAN and the UE. In the RRC-connected state, mobility managed by the network may be supported, and uplink/downlink unicast data for the UE may be processed.

Downlink transport channels for transmission of data from the network to the UE include a Broadcast Channel (BCH) for transmission of system information and a downlink Shared Channel (SCH) for transmission of user traffic or control messages. Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Dedicated Traffic Channel (DTCH), etc.

The physical channel includes several OFDM symbols in a time domain and several sub-carriers in a frequency domain. One sub-frame includes a plurality of OFDM symbols in the time domain. A resource block is a resource allocation unit, and includes a plurality of OFDM symbols and a plurality of sub-carriers. Further, each subframe may use particular sub-carriers of particular OFDM symbols (e.g., a first OFDM symbol) of a corresponding sub-frame for a physical downlink control channel (PDCCH), i.e., an L1/L2 control channel. A transmission time interval (TTI) is a basic time unit the scheduler uses for resource allocation, which may be defined for one slot or a plurality of slots or defined for each mini-slot.

A non-access stratum (NAS) layer above the RRC layer performs functions, such as session management and mobility management.

Hereinafter, a relaying technique according to the present embodiment will be proposed. An example of the present embodiment may apply to the aforementioned various standards/networks, for example, a communication system that supports a time division duplex (TDD) operation. TDD refers to an operation in which a downlink portion for transmission from a base station (e.g., eNB, ng-eNB, or gNB) to a UE and an uplink portion for transmission from the UE to the base station are temporally separated in the same frequency band. In the TDD technique, the uplink portion and the downlink portion may be separated based on symbols according to the above Table 4. Alternatively, other time duration (e.g., subframes, slots) may be used instead of the symbols.

The relaying technique according to the present embodiment is preferably applied to an amplify-and-forward (AF) relay operation. The relay operation encompasses overcoming severe signal attenuation on a link between the UE and the base station by installing a relay in between and amplifying signals. The relay receives a signal sent by the base station and re-transmits it to the UE in downlink, and receives a signal sent by the UE and re-transmits it to the base station in uplink. The AF scheme is a type of such relaying, and the relay performs relaying in such a way as to amplify and forward a received analog signal, without demodulating and decoding the received signal. Such an AF operation is advantageous in that it is easy to implement and costs low because the operation in the relay is simplified.

A decode-and-forward (DF) scheme is a method which is distinct from the AF scheme. Unlike the AF scheme in which a received signal and a transmitted signal are physically the same, except that the amplitude of the signal is amplified, the received signal and transmitted signal in the DF scheme may be configured completely differently. That is, signal components in a logical channel, as well as the coding and waveform of physical signals, may be varied, and a relay supporting the DF scheme may act like a new base station. The DF scheme may increase the manufacturing costs but is advantageous in that noise amplification is not required. On the other hand, the AF scheme has less delay, is easy to implement, and costs low to manufacture, compared to the DF scheme, but is disadvantageous in that noise amplification is required.

Figure 11:
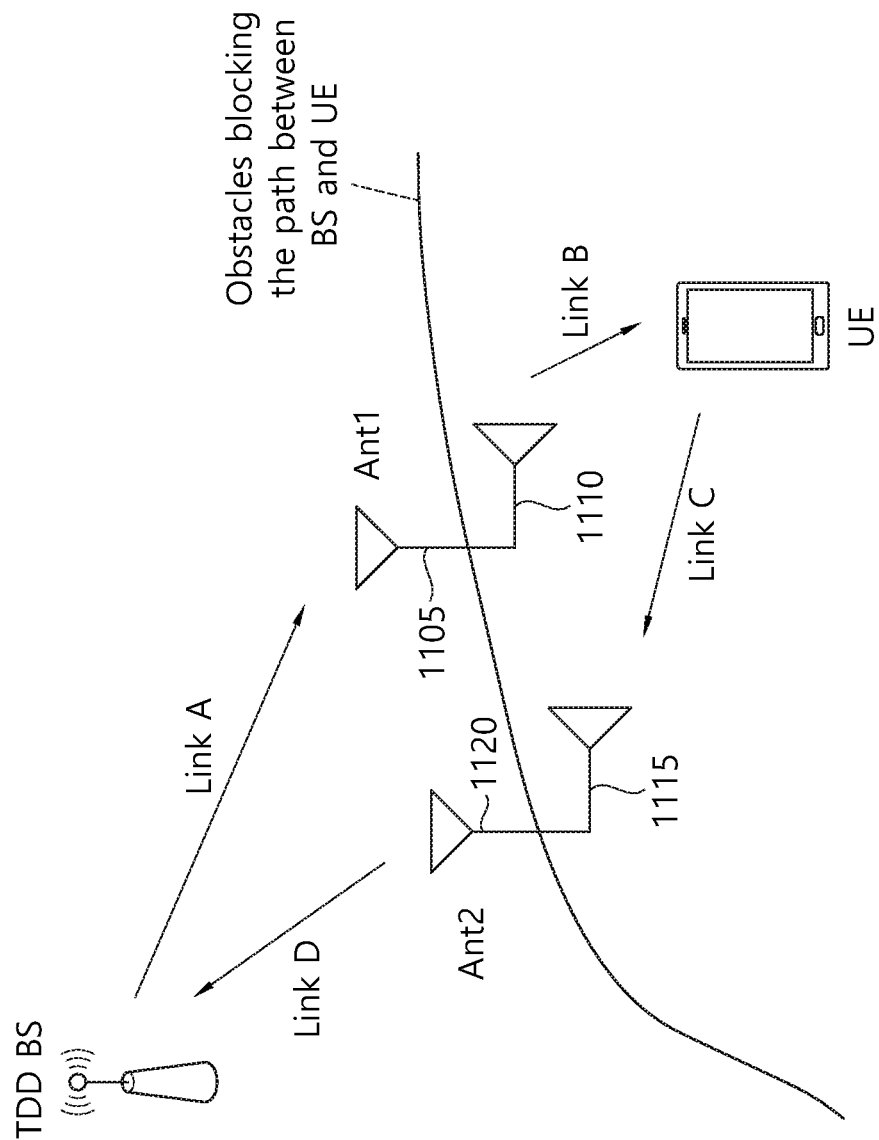
FIG. 11 is a conceptual diagram showing an operation of a relay according to the present embodiment.

FIG. 11 is a conceptual diagram showing an operation of a relay according to the present embodiment. The relay according to the present embodiment may be installed at various locations. For example, the relay may be installed on an obstacle blocking the path between the base station and the UE. The obstacle between the base station and the UE shown in FIG. 11 may come in various forms—for example, an outer wall of a building or vehicle. In a relay structure proposed herein, in order to overcome attenuation caused by an obstacle, antennas 1105 and 1120 may be installed between the base station and the obstacle and connected to antennas 1115 and 1110 installed between the obstacle and the UE to amplify a received signal at one of these antennas and forward it to another antenna.

Specifically, the relay of FIG. 11 may be installed on a metal that makes up the body of the vehicle. Since the vehicle's body is made of metal and therefore causes signal attenuation, the power the UE has to consume for uplink may be increased. To this end, it may be desirable to configure a relay on the vehicle's body.

It is desirable that the relay of FIG. 11 has the antennas 1105 and 1110 for downlink and the antennas 1115 and 1120 for uplink separately. If the relay of FIG. 11 operates in a TDD mode, downlink and uplink will operate at the same frequency. Accordingly, if the antennas 1105 and 1110 operating in the downlink direction and the antennas 1115 and 1120 operating in the uplink direction are located too close to the relay, interference may occur. Therefore, the present embodiment takes into consideration the separate installation of the downlink antennas 1105 and 1110 and the uplink antennas 1115 and 1120.

In FIG. 11, the first antenna ANT1 is an antenna that operates for downlink, and includes an external antenna 1105 and an internal antenna 1110. The external antenna 1105 is used for "link A" shown in the drawing because it receives a signal from the base station, and the internal antenna 1110 is used for "link B" shown in the drawing because it amplifies the received signal and forwards it to the UE.

Also, the second antenna ANT2 is an antenna that operates for uplink, and includes an internal antenna 1115 and an external antenna 1120. The internal antenna 1115 of the second antenna is used for "link C" shown in the drawing because it receives a signal from the UE, and the external antenna 1120 is used for "link D" shown in the drawing because it amplifies a received signal and forwards it to the base station.

As explained above, even if a downlink antenna 1105 and 1110 and an uplink antenna 1115 and 1120 are spaced apart from each other in a space, some link may exist between the two antennas. For example, a signal transmitted through the external antenna 1120 for uplink toward "link D" may be received through the external antenna 1105 for downlink, along with a signal on "link A". Likewise, a signal transmitted through the internal antenna 1110 for downlink toward "link B" may be received through the internal antenna 1115 for uplink, along with a signal on "link C". In the above two cases, a signal between two antennas continues to repeat self-amplification while forming a loop to create strong interference, which may saturate the RF circuit of the relay and disable the relay operation.

Such a problem caused by self-amplification or internal loop may become more serious in a TDD operation. While FDD allows for blocking an unintended received signal since uplink and downlink are separated by frequency, it is difficult to block an unintended signal (i.e., a signal caused by internal loop) in TDD if the relay is not aware of whether the current time region (i.e., symbol, subframe, or slot) is an uplink portion or downlink portion. Particularly, if the relay operates not in the DF scheme but in the AF scheme, information indicating whether the current time region is a downlink or uplink (e.g., information contained in a PDCCH or PDSCH sent by the base station) is not decoded, which makes the problem caused by self-amplification or internal loop may become more serious.

Hereinafter, a detailed technique for solving the foregoing problem will be proposed.

As a way of solving the foregoing problem, the operation of a specific antenna (e.g., an antenna performing a transmission function) in a specific situation may be stopped or limited. For instance, it can be assumed that a signal received by the external antenna 1105 of the first antenna is very strong at a specific point in time. This may occur when the relay is very close to the base station and receives a strong downlink signal. In this case, a downlink signal of a moderate level may arrive at the UE without any relay operation. In other cases, another UE sends an uplink signal near the external antenna 1105 for downlink, whereby a strong signal is acquired. This means an uplink operation at the corresponding point in time, and therefore there is no need to forward a signal with no downlink component to an internal UE. Accordingly, if a signal received by the external antenna 1105 for downlink through "link A" is very strong, the transmission through the internal antenna 1110 may be stopped, or a low amplification rate may be used even if the signal is transmitted through the internal antenna 1110. This prevents re-amplification of a signal transmitted through the external antenna 1120 for uplink.

Similarly, the operation of the antenna 1110 for downlink may be stopped, or the amplification rate may be reduced, depending on the amplitude of a signal received by the internal antenna 1115 for uplink via "link C". If a strong signal is acquired by the internal antenna 1115 for uplink at a specific point in time, this means that the internal UE has performed uplink transmission at a very high rate. Accordingly, the corresponding point in time corresponds to an uplink portion and no downlink operation is required at this point in time. Thus, self-interference amplification may be prevented by stopping the transmission through the internal antenna 1110 for downlink or reducing the amplification rate.

A detailed example of this will be explained in general terms below.

Figure 12:
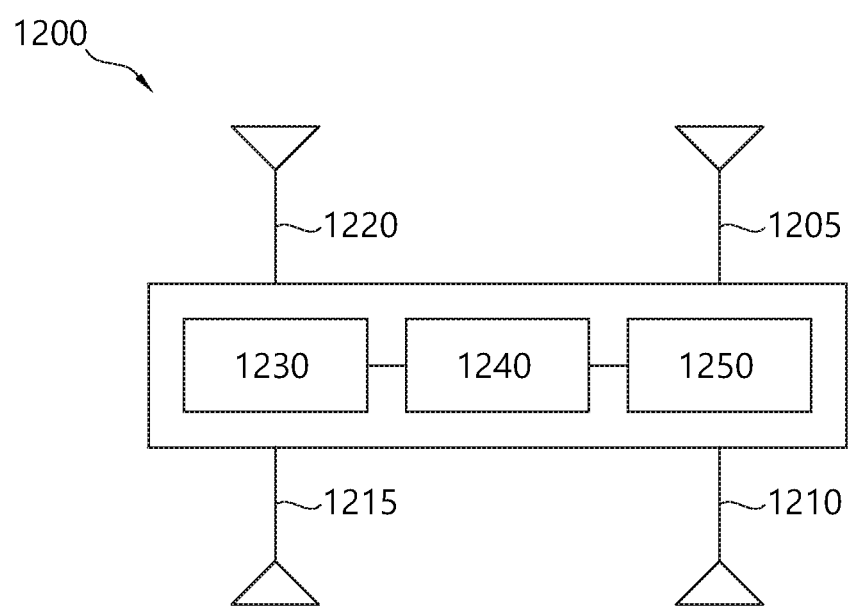
FIG. 12 shows an example of a relay according to the present embodiment.

FIG. 12 shows an example of a relay according to the present embodiment. As described above, the relay 1200 may be installed on an obstacle such as a vehicle body. The relay 1200 supports TDD operation and performs a relaying operation in the AF manner. That is, the relay 1200 of FIG. 12 may determine whether a specific point in time is an uplink portion or downlink portion without decoding a signal such as PDCCH.

The relay 1200 of FIG. 12 includes a first reception antenna 1205 and first transmission antenna 1210 for a first link and a second reception antenna 1215 and second transmission antenna 1220 for a second link. One of the first and second links may correspond to downlink, and the other may correspond to uplink. If the first link corresponds to downlink, the external antenna 1105 for downlink, internal antenna 1110 for downlink, internal antenna 115 for uplink, and external antenna 1220 for uplink, shown in FIG. 11, correspond to the four antennas 1205, 1210, 1215, and 1220 of FIG. 12. The relay 1200 of FIG. 12 is installed on a vehicle. If the first link is downlink, it is preferable that the first reception antenna 1205 and the second transmission antenna 1220 are disposed to face the outside of the vehicle so as to face the base station, and it is preferable that the first transmission antenna 1210 and the second reception antenna 1215 are disposed to face the inside of the vehicle so as to communicate with the inside of the vehicle and the UE.

The relay of FIG. 12 includes an antenna power measuring part 1230. The antenna power measuring part 1230 measures the amplitude of received signals (e.g., received power) received by the first reception antenna 1205 for the first link and the second reception antenna 1215 for the second link. The antenna power measuring part 1230 sends a measurement result to a controller 1240. The controller 1240 may determine whether to run the first transmission antenna 1210 and/or the second transmission antenna 1220 or not or control the amplification rate, according to the measurement result. The operation of each antenna is controlled by an amplification rate limiting part 1250. The amplification rate limiting part 1250 limits the operation of the first transmission antenna 1210 and/or second transmission antenna 1220 (i.e., stops the operation by cutting off transmitted power, or applies a low amplification rate). The antenna power measuring part 1230, the controller 1240, and the amplification rate limiting part 1250 may be collectively referred to as a processor and implemented on a single chip.

For example, if the first link is downlink, the relay of FIG. 12 receives a first radio signal through the first reception antenna 1205 for the first link, and determines whether the current time region is a downlink portion or not based on the amplitude of the first radio signal (e.g., by comparing a threshold and the amplitude of the first radio signal). If the amplitude of the first radio signal is large, the current time region may be regarded as downlink. In this case, the amplification rate of the second transmission antenna 1220 for the second link may be limited. That is, the operation of the second transmission antenna (i.e., external antenna for uplink) may be stopped, or an amplification rate lower than the given amplification rate may be applied. If the amplification rate of the second transmission antenna 1220 is limited, the relay 1200 may relay the first radio signal through the first transmission antenna 1210. All of these operations are performed according to the AF scheme without decoding the radio signal.

That is, in the present embodiment, the technique of stopping the operation of the antennas 1210, 1220, 1110, and 1120 performing the transmission function or applying a low amplification rate only is limited according to the determination of the controller 1240 of the relay. For example, if the operation of an antenna performing the transmission function is stopped and resumed, it may take a certain amount of time to resume the operation of the transmission antennas 1210 and 1220. That is, it takes time to resume the operation of the transmission antennas 1210 and 1220, and therefore some of the signals received by the reception antennas 1205 and 1215 may not be relayed. However, since a radio signal according to the present embodiment contains an OFDMA/SC-FDMA symbol including a CP, proper signal processing may be done by the base station and the UE even if part of the signal is not relayed.

An additional modification of the above example may be made as in the following detailed example.

Referring to FIG. 11, it is possible to stop the operation of a specific antenna or reduce the amplification rate by comparing the amplitudes of signals received by the external antenna 1105 for downlink and the internal antenna 1115 for uplink. In an example, if the amplitude of a signal received by the external antenna 1105 for downlink is larger than the amplitude of a signal received by the internal antenna 1115 for uplink by a certain amount or greater (for example, the amplitude of a signal received by the external antenna 1105 for downlink>the amplitude of a signal received by the internal antenna 1115 for uplink+offset), the corresponding point in time is regarded as a downlink portion, and the transmission through the external antenna 1120 for uplink may be stopped or the amplification rate may be reduced. In another example, if the amplitude of a signal received by the internal antenna 1115 for uplink is larger than the amplitude of a signal received by the external antenna 1105 for downlink by a certain amount or greater (for example, the amplitude of a signal received by the internal antenna 1115 for uplink>the amplitude of a signal received by the external antenna 1105 for downlink+offset), the corresponding point in time is regarded as an uplink portion, and the transmission through the internal antenna 1110 for downlink may be stopped or the amplification rate may be reduced. If the amplitudes of the signals received by the two reception antennas 1105 and 1115 are within a certain level, it is difficult to identify a downlink or uplink portion and therefore transmission may be performed in the two directions. This does not mean that a strong signal is received by one of the two antennas, and therefore it is possible to prevent excessive self-interference amplification.

The above example will be described in general terms below with reference to FIG. 12.

That is, the controller 1240 of FIG. 12 controls the operation of the transmission antennas 1210 and 1220 by taking into consideration the amplitude of a second radio signal received by the second reception antenna 1215, along with the first radio signal received by the first reception antenna 1205. That is, if the amplitude of the first radio signal is larger than the amplitude of the second radio signal by a first offset value or greater, the operation of the second transmission antenna 1220 may be limited (i.e., the operation is stopped or a low amplification rate is applied). If the amplitude of the second radio signal is larger than the amplitude of the first radio signal by a second offset value or greater, the operation of the first transmission antenna 1210 may be limited (i.e., the operation is stopped or a low amplification rate is applied). The first and second offset values may be set to be the same or different, and may be fixed or changed through an external signal.

The above example was an example in which the relay 1200 controls the transmission antennas without explicit information about whether the current time region is uplink or downlink. In another method, the UE informs the relay 1200 of information on the operation of the UE at the current point in time through a separate interface, and the relay 1200 may stop the transmission through a specific antenna 1210 and 1220 or reduce the amplification rate based on this information. Examples of this information are as follows.

In the first example, information about whether a cell to which the UE belongs performs an uplink or downlink operation at a specific point in time may be forwarded. The UE may find out when uplink or downlink occurs via communication with the base station, and therefore may inform the relay of this to allow the relay to perform a proper operation.

In the second example, information about whether the UE performs transmission or reception at a specific point in time may be forwarded. Although this example is similar to the first example, the UE does not transmit this information in all uplink portions, and therefore an uplink portion with no transmission from the UE is indicated just like a downlink portion.

In the third example, information about whether the UE performs transmission or not at a specific point in time may be forwarded. This example is similar to the second example, and this information does not need to be generated from the UE's modem but may be found out depending on whether the UE's transmission circuit is activated or not, thereby offering the advantage of not having to build such an interface.

An interface that can be used in this method may be a radio interface for cellular communication, other radio interfaces such as WiFi or Bluetooth, or an interface connected by wires.

Regarding this operation, if a TDD cell exists in a number of frequency bands, the configurations of downlink and uplink portions in each band may be inconsistent with the configuration in other bands. Accordingly, the above-explained operation may be performed individually for each band.

Figure 13:
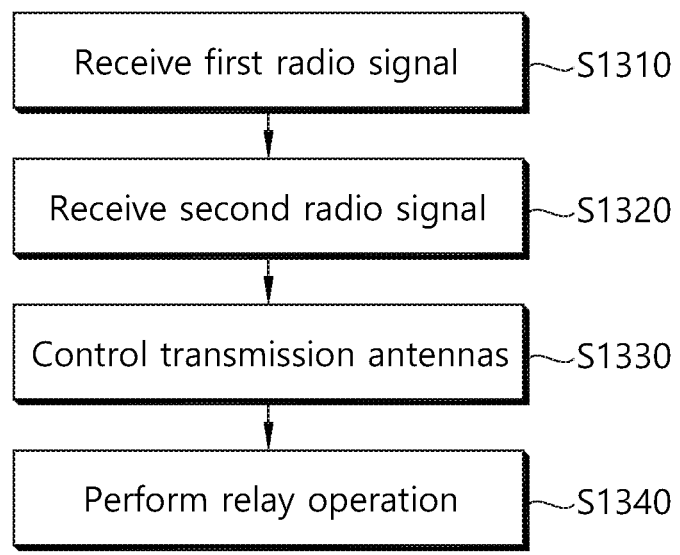
FIG. 13 is a process flowchart of a method to which the above example is applied.

FIG. 13 is a process flowchart of a method to which the above example is applied. The technique of FIG. 13 may be implemented in the device of FIG. 12.

In the step S1310, an operation of receiving a first radio signal through the first reception antenna 1205 for the first link may be performed. In the step S1320, an operation of receiving a second radio signal through the second reception antenna 1215 for the second link may be performed.

In the step S1330, the amplification rate of the first transmission antenna for the first link and the amplification rate of the second transmission antenna for the second link are limited based on the amplitude of the received first radio signal and the amplitude of the received second radio signal. The measurement of the amplitude of the radio signals is done by the antenna power measuring part 1230, and the operation of limiting the amplification rate of the first transmission antenna for the first link or the amplification rate of the second transmission antenna for the second link is performed by the controller 1240 and the amplification rate limiting part 1250. For example, if the amplitude of the first radio signal is larger than a threshold or the amplitude of the first radio signal is larger than the amplitude of the second radio signal by an offset value or greater, the amplification rate of the second transmission antenna may be limited.

In the step S1340, a relay operation is performed. For example, if the amplification rate of the second transmission antenna is limited, the relay may relay the first radio signal through the first transmission antenna without decoding the first radio signal (i.e., in the AF manner).

Although the aforementioned exemplary system has been described on the basis of a flowchart in which steps or blocks are listed in sequence, the steps of the present embodiment are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present embodiment.

What is claimed is:

1. A method of supporting a time division duplex (TDD) operation for temporally multiplexing a downlink and an uplink, the method performed by a relay in the vehicle and comprising:
    receiving, by the relay, a first radio signal through a first reception antenna for the downlink;
    limiting, by the relay, an amplification rate of a second transmission antenna for the uplink, based on determining that an amplitude of the first radio signal is greater than a pre-determined threshold value; and
    relaying, by the relay, the first radio signal through the first transmission antenna without decoding the first radio signal,
    wherein the first reception antenna for the downlink and the second transmission antenna for the uplink are disposed to face the outside of the vehicle, and
    wherein the first transmission antenna for the downlink and a second reception antenna for the uplink are disposed to face the outside of the vehicle.

2. The method of claim 1, wherein the limiting of the amplification rate of the second transmission antenna comprises preventing, by the relay, transmission through the second transmission antenna.

3. A device for a relay that supports a time division duplex (TDD) operation in a vehicle, the device comprising:
    a first antenna comprising a first reception antenna and first transmission antenna for a downlink;
    a second antenna comprising a second reception antenna and second transmission antenna for an uplink; and
    a processor that:
        receives a first radio signal through the first reception antenna,
        limits an amplification rate of the second transmission antenna, based on determining that an amplitude of the first radio signal is greater than a pre-determined threshold value, and
        relays the first radio signal through the first transmission antenna without decoding the first radio signal if the amplification rate of the second transmission antenna is limited,
    wherein the first reception antenna and the second transmission antenna are disposed to face the outside of the vehicle, and
    wherein the first transmission antenna and the second reception antenna are disposed to face the outside of the vehicle.

4. The device of claim 3, wherein the processor limits the amplification rate of the second transmission antenna by preventing transmission through the second transmission antenna.

* * * * *